United States Patent [19]

McCann

[11] Patent Number: 4,591,875

[45] Date of Patent: May 27, 1986

[54] INK CARTRIDGE AND COOPERATIVE CONTINUOUS INK JET PRINTING APPARATUS

[75] Inventor: James D. McCann, Waynesville, Ohio

[73] Assignee: Eastman Kodak Company, Rochester, N.Y.

[21] Appl. No.: 722,558

[22] Filed: Apr. 12, 1985

[51] Int. Cl.⁴ .......... G01D 15/18

[52] U.S. Cl. .......... 346/75

[58] Field of Search .......... 346/75

[56] References Cited

U.S. PATENT DOCUMENTS 3,831,727 8/1974 Kruspe et al. .......... 400/126 X 3,929,071 12/1975 Cialone et al. .......... 101/335 X 4,005,435 1/1977 Lundquist et al. .......... 346/1.1 X 4,399,446 8/1983 McCann et al. .......... 346/140 R X

*Primary Examiner*—E. A. Goldberg

*Assistant Examiner*—Gerald E. Preston

*Attorney, Agent, or Firm*—John D. Husser

[57] ABSTRACT

An ink circulation system for continuous ink jet printers includes a replaceable ink cartridge, forming a supply/-return reservoir, and cooperative positioning and interconnection structure of the printer apparatus. The cartridge includes valved ports that are adapted to cooperate with valved terminals of the printer conduits in a manner obviating ink spillage. The system provides cooperative positioning and engagement structures of the cartridge and printer, which simplify cartridge insertion and removal.

13 Claims, 10 Drawing Figures

INK CARTRIDGE AND COOPERATIVE CONTINUOUS INK JET PRINTING APPARATUS

BACKGROUND OF THE INVENTION

1. Field of the Invention

The present invention relates to improvements in the ink supply and circulation system of continuous ink jet printers and more specifically to ink cartridge constructions and cooperative structure of such printer apparatus that facilitate user replacement of ink supply/return reservoirs.

2. Description of the Prior Art

In continuous ink jet printing apparatus streams of uniformly spaced ink drops are created by imposing predetermined vibrations upon liquid ink filaments issuing from an orifice plate. The filaments are formed by supplying ink under pressure to a print head cavity that is in communication with the orifice plate. Information is imparted to the droplet streams by selective non-charging or charging and deflection of droplets. A portion of the droplets pass to the recording medium but there are a substantial number of non-printing droplets that are intercepted by a catcher for recirculation. Often the print head cavity has an outlet other than the orifice plate (e.g. to facilitate dynamic pressure control within the cavity at start-up), and the apparatus ink supply system also circulates such ink flow. In many applications there are a variety of other fluid couplings to the ink reservoir that may be useful.

In view of the relatively complicated nature of the fluid system of continuous ink jet printing apparatus, one common approach has been to construct the ink supply/return reservoir as a permanent part of the printer. Thus all couplings between the supply/return reservoir and the various fluid lines of the printer are of a permanent nature and ink is added to the reservoir, when needed, e.g. by pouring from a bulk supply. This approach is perfectly acceptable for printer applications wherein dedicated operators perform the machine maintenance. However, in office applications, where the maintenance is performed by less-trained users and ink spillage is more objectionable, this approach is not desirable. It therefore is advantageous to provide ink for such office-environment printers in disposable cartridges that are simply insertable and removable by relatively inexperienced operators.

Such a disposable cartridge approach has been used in more simple ink jet printers, e.g. drop on demand printers, as well as in electrographic printing apparatus for replenishing toner. One typical prior art implementation of the cartridge approach provides a penetratable or rupturable closure portion on the cartridge and cooperative probes within the apparatus which penetrate or open the cartridge when it is inserted by the operator. While this implementation is useful for simplifying the operator involvement, it is not always adequate from the ink spillage view-point. Further, in more sophisticated continuous ink jet printing apparatus, there are often a plurality of predetermined connections that must be reliably and accurately effected between the ink circulation system of the apparatus and any replaceable supply/return reservoir.

SUMMARY OF THE INVENTION

Thus, one important object of the present invention is to provide for a continuous ink jet printer, a system comprising an ink cartridge and cooperative printer structure, that simplifies and improves the operator's replenishment of ink. In one aspect the present invention provides an improved ink cartridge that is adapted for self-sealing prior to and after use in the apparatus and that is constructed so that a plurality of cartridge parts will be reliably engaged in predetermined operative communications with particular fluid line couplings of the printer apparatus. In another aspect the present invention provides improved printer structure which is adapted to receive such a cartridge and reliably engage the cartridge parts in a predetermined manner.

Generally, in one embodiment of the cartridge aspect of the present invention, the ink cartridge can comprise side, top and bottom walls forming an ink supply/return reservoir; means in the top wall for defining a plurality of cartridge ports including: (i) an ink supply port and (ii) an ink return port; and means, respectively in each of such ports, that are biased to a normally closed condition.

Generally, in one embodiment of the printer aspect of the present invention, the printer apparatus includes a cartridge interface construction comprising housing structure for predeterminedly positioning an ink cartridge within said apparatus; a plurality of fluid-line terminals including supply and return conduit terminals, each: (i) predeterminedly located relative to the housing means, (ii) biased to a normally closed position and (iii) actuatable to an open condition by engagement with predetermined structure of an ink cartridge; and means for moving an ink cartridge, so-positioned in the housing, between valve-opening and spaced positions relative to the conduit terminals.

In another general aspect the present invention constitutes an improved ink circulation system for jet printer apparatus that comprises both the cartridge and receiving and interface constructions in combination.

BRIEF DESCRIPTION OF THE DRAWINGS

The subsequent description of preferred embodiments of the invention refers to the attached drawings wherein.

DETAILED DESCRIPTION OF THE PREFERRED EMBODIMENTS

Figure 1:
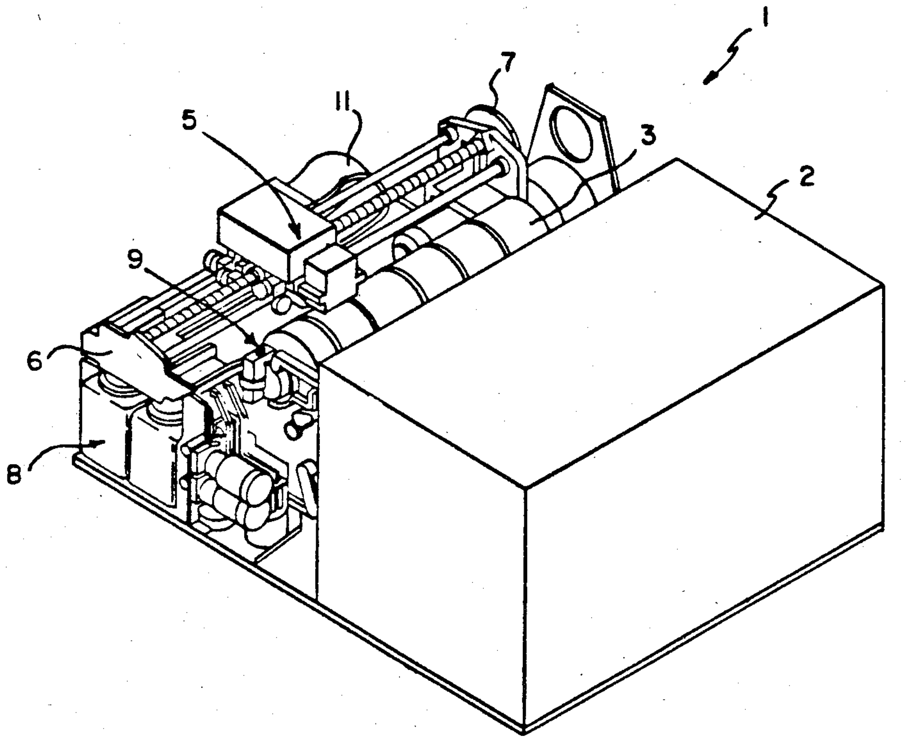
FIG. 1 is a perspective view of one continuous ink jet printing apparatus with which the present invention is useful.

FIG. 1 illustrates schematically an exemplary ink jet printing apparatus 1 employing one embodiment of the present invention. In general, the apparatus 1 comprises a paper feed and return sector 2 from which sheets are transported into and out of operative relation on printing cylinder 3. The detail structure of the sheet handling components do not constitute an essential part of the present invention and need not be described further. Also illustrated generally in FIG. 1 is a print head assembly 5 which is mounted for movement on carriage assembly 6 by appropriate drive means 7. During printing operation the print head assembly is traversed across a print path in closely spaced relation to a print sheet which is rotating on cylinder 3. Ink is supplied to and returned from the print head assembly by means of flexible conduits which are coupled to ink supply cartridges 8. A storage and start-up station 9 is constructed adjacent the left side (as viewed in Fig. 1) of the operative printing path of print head assembly 5 and the drive means 7 and carriage assembly 6 are constructed to transport the print head assembly into operative relations with station 9 at appropriate sequences of the apparatus cycle.

Figure 2:
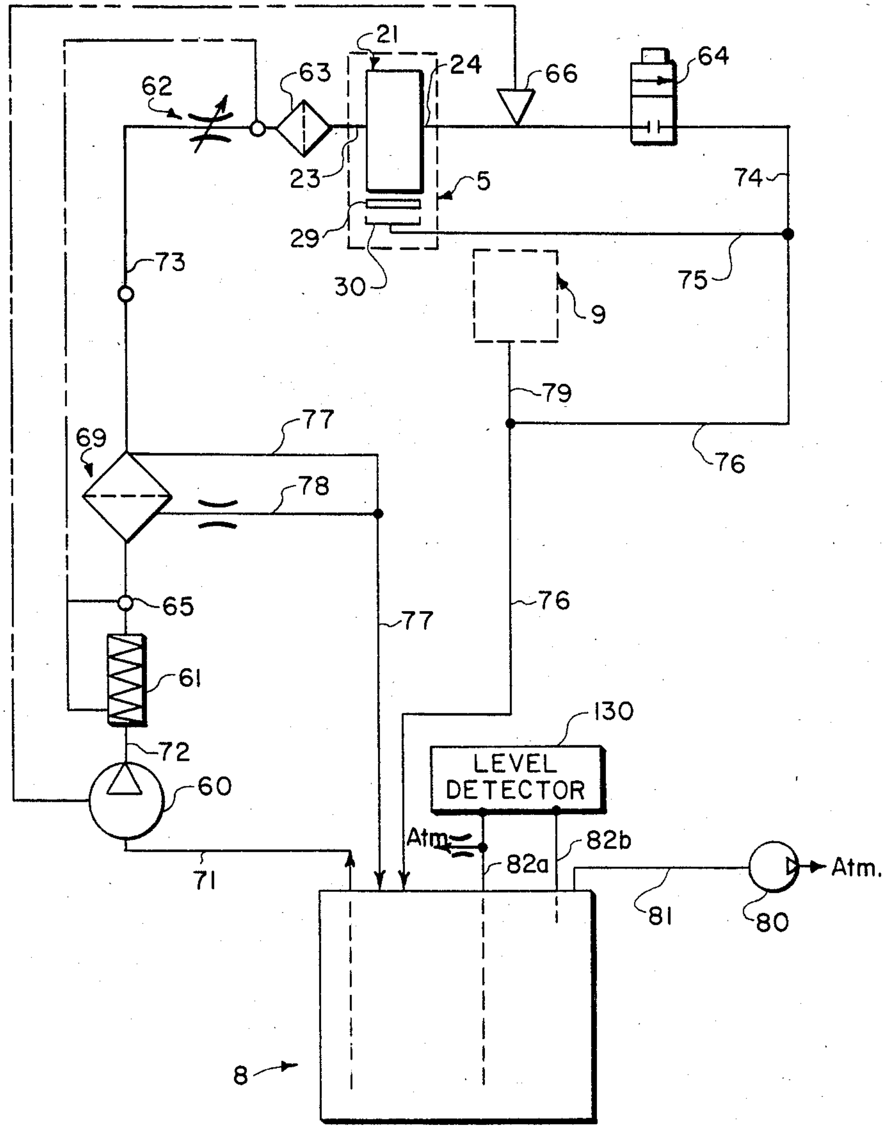
FIG. 2 is a schematic illustration of one preferred continuous ink jet printer fluid handling system with which the present invention is useful.

Referring to the schematic diagram of FIG. 2, the print head assembly 5 includes an upper portion and a lower portion. The upper portion can include a print head body 21 having an inlet 23 for receiving ink. The body 21 can comprise a passage leading to a print head cavity, the orifice plate structure of the printer (not shown) and the print head outlet 24. The upper print head portion also includes a suitable transducer means (not shown) for imparting mechanical vibration to the body. Such transducer can take various forms known in the art for producing periodic perturbations of the ink filament(s) issuing from the orifice plate to assure formation break-up of the ink filaments into streams of uniformly spaced ink droplets. One preferred kind of construction for the print head body and transducer is disclosed in U.S. application Ser. No. 390,105, entitled "Fluid Jet Print Head" and filed June 21, 1982, now continuation-in-part, Ser. No. 06/777,102 filed Sept. 17, 1985 in the name of Hilarion Braun; however, a variety of other constructions are useful in accord with the present invention. Preferred orifice plate constructions for use in accord with the present invention are disclosed in U.S. Pat. No. 4,184,925; however, a variety of other orifice constructions are useful.

The lower portion of print head assembly 5 includes a charge plate 29 constructed to impart desired charge upon ink droplets at the point of filament break-up and a drop catcher 30 that is constructed and located to catch non-printing droplets (in this arrangement charged droplets). Exemplary preferred charge plate constructions are disclosed in U.S. application Ser. No. 517,608, entitled "Molded Charge Electrode Structure" and filed July 27, 1983, now abandoned, further filed as continuation-in-part Ser. No. 06/696,682, now U.S. Pat. No. 4,560,991 in the name of W. L. Schutrum and in U.S. Pat. No. 4,223,321; however, other charge plate constructions are useful in accord with the present invention. Exemplary catcher configurations are described in U.S. Pat. Nos. 3,813,675; 4,035,811 and 4,268,836; again other constructions are useful.

During the printing operation ink filaments are ejected through the orifices in plate and, under the influence of the transducer on body, break up into streams of uniformly sized and spaced droplets. The charge plate is located proximate the zone of filament break-up and is adapted to selectively charge or not charge each droplet in each of the streams in accordance with information signals respectively transmitted to the various charge sectors of the charge plate. The charged droplets are deflected to catcher 30 for recirculation back to the ink print head, while uncharged droplets pass on to the print substrate.

One ink supply and circulation system in accord with one embodiment of the present invention is shown in FIG. 2 and includes various ink conduits or "lines" which form the ink circulation path. Specifically, pump inlet line 71 extends from ink supply cartridge 8 to the inlet of pump 60, pump outlet line 72 extends between pump 60 and main filter 69, head supply line 73 extends from main filter 69 to the print head inlet and head return line 74 extends from the print head outlet to a junction between catcher return line 75 and the main ink return line 76. The main return line 76 is also connected to home station return line 79. An air bleed line 78 and an ink bypass line 77 extend from main filter 61 back to cartridge 8. A vacuum pump 80 is coupled to the cartridge interior via conduit 81 to facilitate ink return via line 76. As will be clear from the subsequent description, the present invention is not limited to use with the particular ink circulation line arrangement shown in FIG. 2. Other elements of the FIG. 2 embodiment such as ink heater 61, variable flow restrictor 62, final filter 63, head return valve 64, temperature sensor(s) 65 and pressure sensor 66 are not necessary for the practice of the present invention, but can be usefully incorporated with it.

Figure 3:
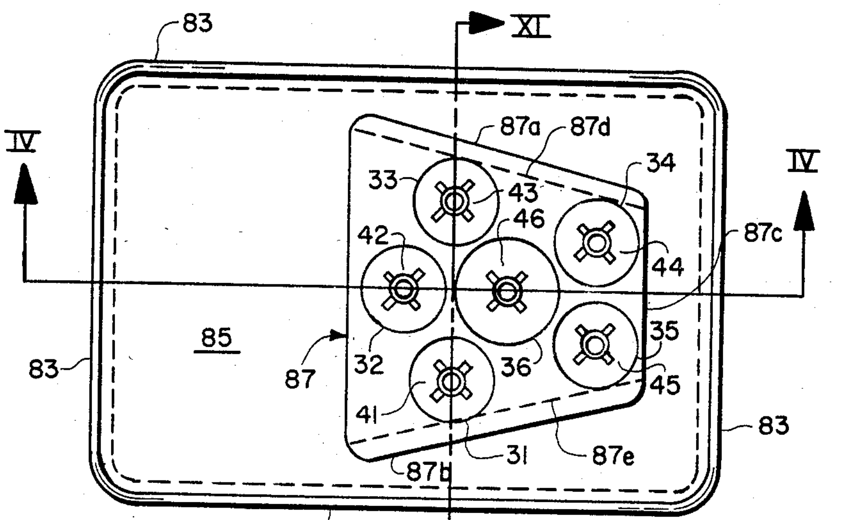
FIG. 3 is a top view of one ink cartridge embodiment of the present invention.
Figure 4:
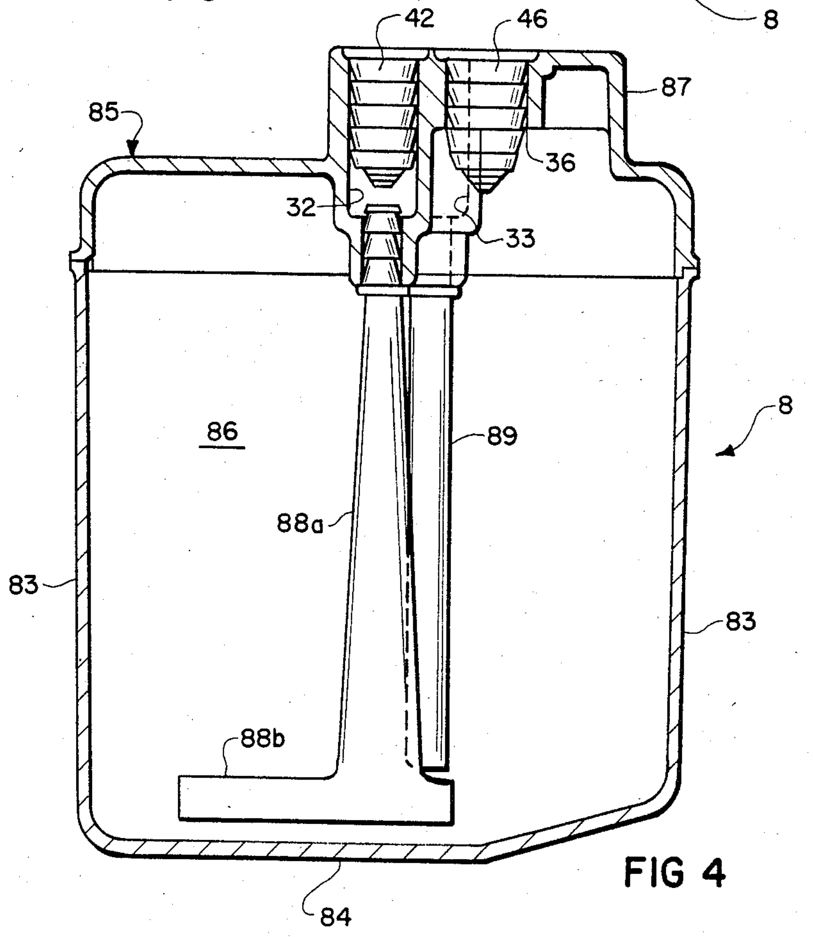
FIG. 4 is a cross section along the lines IV—IV of FIG. 3.
Figure 5:
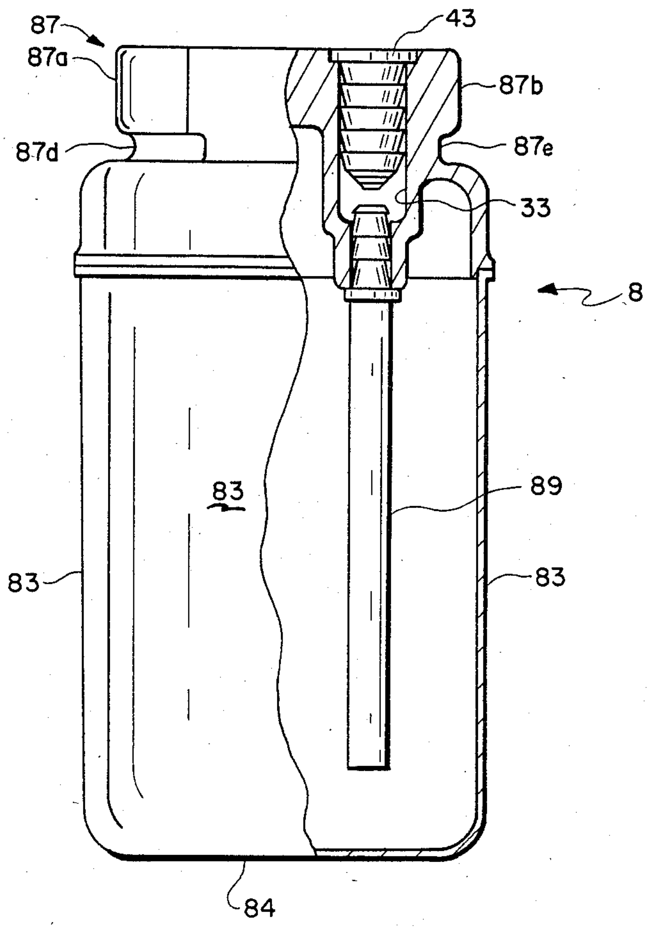
FIG. 5 is a side view partially in cross section of the cartridge shown in FIG. 2.

Considering now the inventive aspects of the ink supply and circulation system, and referring to FIGS. 3, 4 and 5, the cartridge 8 is constructed to be readily inserted and removed, as a unit, from operative relation with lines of the ink circulation system. More particularly, the cartridge 8 comprises side walls 83, bottom wall 84 and a top wall 85 which define an enclosed ink supply/return reservoir 86. The top wall 85 of the cartridge has a raised portion denoted generally 87 in which are formed ports 31, 32, 33, 34, 35 and 36 which each provide a fluid path from the cartridge exterior to the supply/return reservoir 86. Those ports respectively have mounted therein valve members 41, 42, 43, 45 and 46 which are biased to a closed position.

Figure 6:
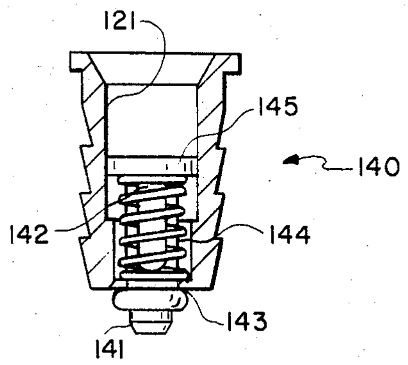

A representative cartridge valve 140 is shown in more detail in FIG. 6. The cartridge valve members each have female portions 121 that are adapted to interfit with a male portion of a conduit terminal (to be described subsequently) to provide a coupling that effects a sealed passage into the cartridge. Each cartridge valve includes a closure portion that is biased to a normally closed position by resilient means, e.g. spring 142. The closure portion 141 is movable against the valve's self-bias to a position that opens the lower valve orifice 143, and thus its respective cartridge port, for fluid communication with cartridge interior. The closure member 141 is integrally coupled to a stem portion 144 and an apertured flange 145 which are located within the passage through the valve body.

The cartridge embodiment shown in FIGS. 3–5 is designed to cooperate with the fluid system shown in FIG. 2. Thus, port 32 is intended for coupling to pump inlet line 71, port 36 is intended for coupling to return line 76, port 35 is intended for coupling to bypass and air bleed return line 77, port 34 is intended for coupling to vacuum line 81 and ports 33 and 34 are intended for coupling to level sensor lines 82*a* and 82*b*. The cartridge interior includes an ink supply conduit 88*a*, coupled to port 32, which extends to a location proximate the bottom wall 84 and terminates in a filter section 88*b*. An ink level sensing tube 89 is coupled to port 33.

To accomplish facile insertion and removal of the cartridge 8 into and from operative relation with the printer's fluid handling system, the cartridge and interface structure of the printer are provided in accord with the present invention, with a number of cooperative features. Thus each of the apparatus conduits that are to be coupled to the cartridge 8 have male terminals that are constructed to interfit in a sealed fluid communication with the valved ports of the cartridge. Specifically, terminal 102 (for supply conduit 71) is adapted to mate with valved port 32, terminals 101 and 103 (for sensor conduits **82*a* and 82*b*) are adapted to mate with valved ports 31 and 33, terminal 106 (for return conduit 76) is adapted to mate with valved port 36, terminal 104 (for vacuum conduit 81) is adapted to mate with valved port 34 and terminal 105 (for bypass conduit 77) is adapted to mate with valved port 35**. The function of the sensor conduits and their cooperative cartridge structures is described in detail in U.S. application 06/722,549 filed concurrently, entitled "Ink Level Detection System for Ink Jet Printing Apparatus".

Figure 7:
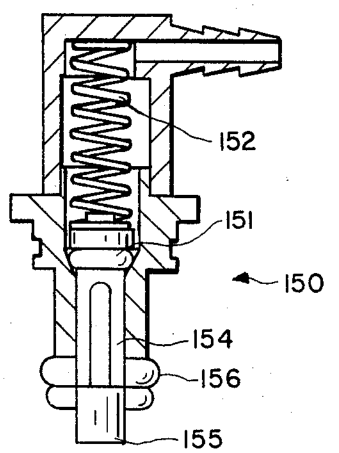
FIGS. 6–8 are cross-sectional views of the valve structure of the FIG. 2 cartridge and of the cooperative printer apparatus terminal structure.
Figure 8:
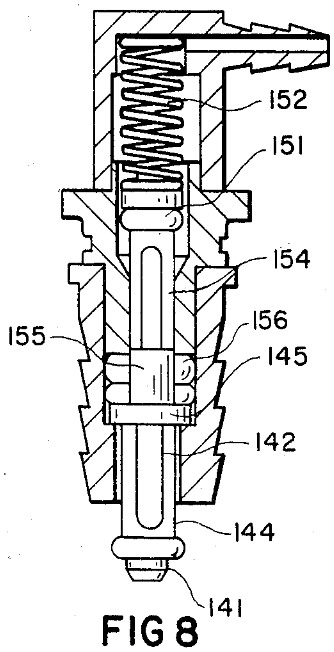

A representative terminal construction is shown in more detail in FIG. 7. Thus, the terminal 150 also is provided with a closure portion 151 that is biased by resilient means, e.g. spring 152, to a normally closed condition. The portion 151 is integrally coupled to stem portion 154 and an apertured abutment portion 155. The closure portion 151 is actuatable to an open condition by pressure engagement of the abutment portion 155 with the flange portion 145 of its cooperative valved port in cartridge 8. Similarly, the closure portion 141 of cartridge valve member 140 is actuatable to an open condition by such engagement. The coupled engagement of valve 140 and terminal 150 is shown in FIG. 8. The terminal portion 150 includes sealing ring 156 that is adapted to interfit in the passage of valve 140.

In accord with the present invention the proper alignment of the respective cartridge valves and conduit terminals and their engagement and disengagement are effected by cooperative alignment structures on the cartridge and on the cartridge interface portion of the printer's cartridge housing. Specifically, the raised portion 87 of cartridge 8 includes longitudinal alignment edges **87*a* and 87*b* which taper together in the direction of an abutment edge 87*c*. In addition, each of the longitudinal edges is provided with a recessed lifting groove, respectively 87*d* and 87*e***.

Figure 9:
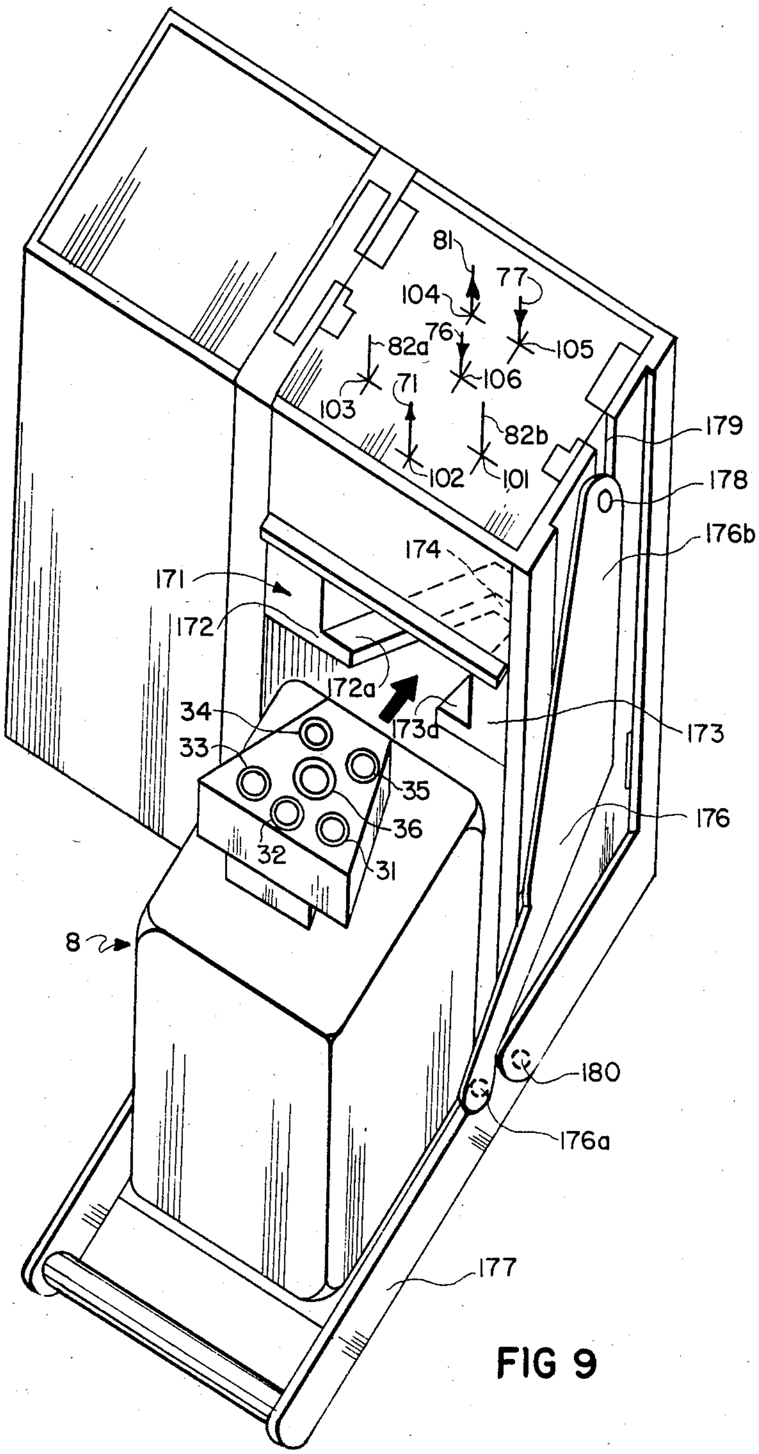
FIGS. 9 and 10 are perspective views of the cartridge-receiving and interface construction of one printer embodiment according to the present invention.
Figure 10:
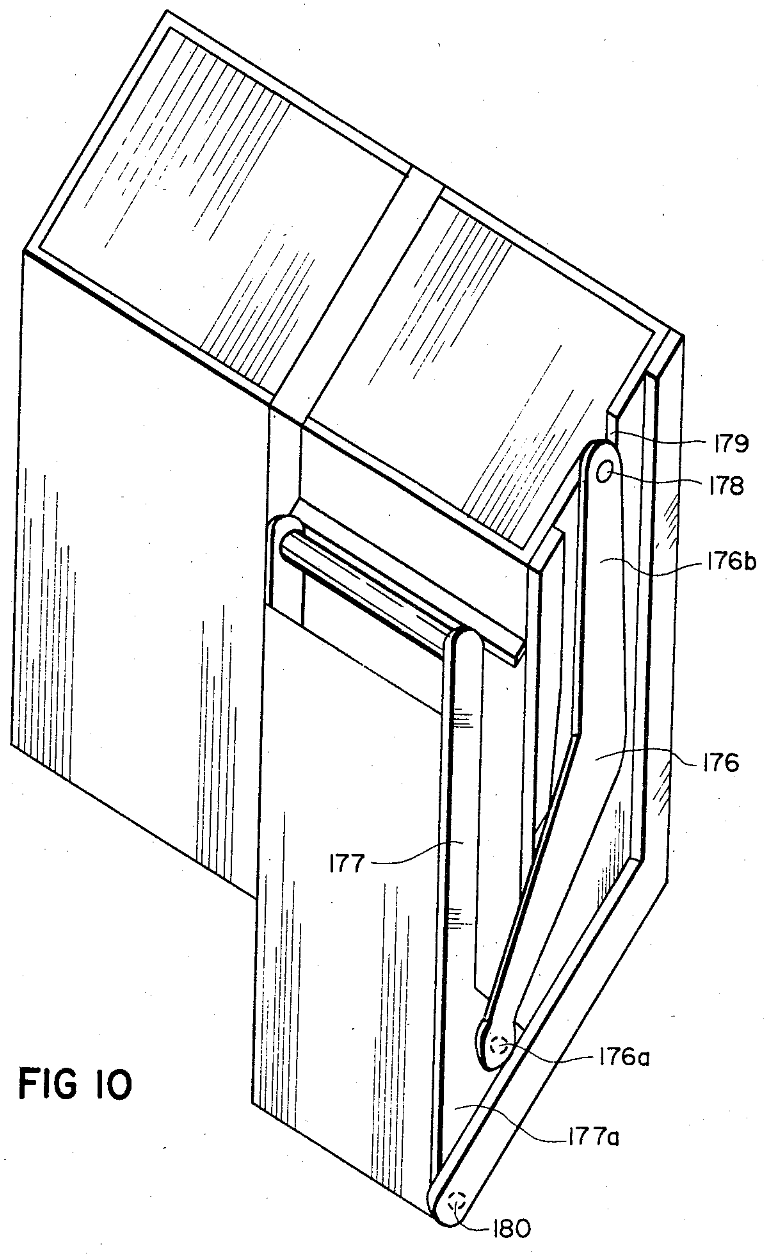

The cartridge interface construction of the printer is provided in cartridge housing 120 of the printer apparatus, see FIGS. 1, 9 and 10. The conduit terminals are located in a top wall 170 of the housing with their cooperative coupling structures facing downwardly so as to be engageable with their respective mating ports in the top of a cartridge that is inserted into the housing. In order to properly align the ports and valve structure of an inserted cartridge with proper terminals and related valve structure of the printer, an alignment and engagement member 171 is supported within the housing in a position for engaging the guide and abutment edges of an inserted cartridge. Thus the member 171 includes alignment and engagement arms 172 and 173 that diverge outwardly from a stop surface 174, to an extent that conforms to the inward taper of the sides of the raised portion of cartridge 8. The arms 172, 173 are spaced apart a distance such that when the abutment surface of a cartridge has been moved into contact with stop 174 of the alignment and engagement member (as guided by the cooperation of edges **87*a* and 87*b* with the arms 172 and 173), the flanges 172*a* and 173*a* of the arms are snugly within the recesses 87*d* and 87*e*** of those cartridge edges.

When a cartridge has been inserted in the above-described manner, it is properly aligned vis-a-vis the conduit terminals and means for lifting the cartridge into engagement with the terminal can be actuated. One preferred device for effecting this lifting engagement is, as shown in FIGS. 9 and 10, a toggle linkage 176 coupling housing door 177 of the printer's cartridge housing to reciprocatory drive 178, 179 for the member 171. As shown, the toggle linkage 176 is coupled to a flange **177*a* of the door at pivot 176*a* and is adapted to raise the lift arms in response to door closure on its pivot 180** and lower the lift arms in response to the opening of the door. The toggle linkage has an over-center position slightly beyond the uppermost movement of the door movement and thus the uppermost movement of the lift arms.

In operation, a cartridge that has been guided to an aligned position is raised in response to door closure by the raising of linkage 176 due to its cupling at **176*a* with door 177**. The female coupling portions of the cartridge ports are thus moved into mating engagement with the male coupling portions of the conduit terminals. The upward movement of the cartridge causes mutual opening of both the cartridge and terminal valves and the final over-center movement of the toggle linkage allows the cartridge to back-off slightly to a position where both valve sets are open. The normal bias of the valve sets retains the toggle linkage in its over-center position which is the normal operative position for printer operation. When it is desired to remove a cartridge the door is opened, moving the cartridge initially upward to pass the over-center position of the toggle linkage and then moving the lift arms downwardly to disengage the cartridge ports from the conduit terminals. This disengagment effects immediate closure of both valve sets so that no ink leakage can occur from either the cartridge or the printer conduits. An empty cartridge can then be removed and replaced with a full cartridge.

Thus the present invention provides for extremely convenient cartridge replacement in a reliable manner. The valve sets are precisely aligned in proper operative relation by the cooperative guide structure. The cooperative lift structure effects cartridge engagement and disengagement in a reliable manner. For example, note that the engagement at the cartridge top avoids any possibility for improper coupling of the valve sets because any yielding (e.g. resilience that might be inherent in the overall cartridge body) is avoided by the unique top engagement. The valve sets mutually open and close their related mates and thus avoid any possiblity of ink spillage.

The invention has been described in detail with particular reference to preferred embodiments thereof, but it will be understood that variations and modifications can be effected within the spirit and scope of the invention.

What is claimed is:

1. For use with continuous ink jet printing apparatus of the kind including an ink supply for feeding ink to a print head assembly and ink return means for returning ink from the print head assembly, an ink cartridge comprising:

(a) side, top and bottom wall means forming an ink supply and return reservoir;

(b) means in said top wall means for defining: (i) an ink supply port and (ii) an ink return port; and (c) first and second valve means, respectively in said supply and return ports, both of said valve means being biased to a normally closed condition, said supply and return ports and their respective valve means being constructed and located for respective valve-opening engagements, with the supply and return means of such apparatus.

2. The invention defined in claim 1 wherein said supply port of said cartridge is coupled to an ink supply conduit extending within said cartridge reservoir to a location proximate said bottom wall and said ink supply conduit includes ink filtering means.

3. The invention defined in claim 1 wherein said top wall means comprises a raised central portion having a pair of longitudinal alignment edges and an abutment edge generally transverse to said longitudinal alignment edges and wherein the egress openings of said supply and return ports are in said raised central portion.

4. The invention defined in claim 3 wherein said longitudinal alignment edges each include a recessed groove constructed for cartridge-lifting engagement by such printer appartus.

5. The invention defined in claim 3 wherein said cartridge top wall further comprises means defining (i) a vacuum port, (ii) a bypass ink flow inlet port and (iii) an ink level port(s) located within said raised central portion, each of said last-mentioned ports including respective valve means that are biased to a normally closed condition and are constructed and located for valve-opening engagements with respective conduit structure of such printing apparatus.

6. The invention defined in claim 3 wherein said longitudinal alignment edges taper together in the direction of said abutment edge.

7. In continuous ink jet printing apparatus of the kind including a print head assembly, supply conduit means for supplying ink to said assembly and return conduit means for returning ink from said print head assembly, a cartridge receiving and interface construction comprising:

(a) housing means for positioning an ink cartridge in a predetermined location within said apparatus;

(b) supply and return conduit terminal means, each located at a predetermined location relative to said housing means and each including a valve member biased to a normally closed position and actuatable to an open condition by engagement with predetermined structure of an ink cartridge; and (c) means for moving an ink cartridge positioned in said housing between valve-opening and spaced positons relative to said terminal means.

8. The invention defined in claim 7 wherein said positioning means comprises a pair of spaced lifting arms that are movable by said moving means.

9. The invention defined in claim 8 wherein said positioning means further includes stop member located between said lifting arms.

10. The invention defined in claim 8 wherein said lifting means comprises a toggle linkage having an overcenter condition when a supported ink cartridge is in said valve-opening position.

11. The invention defined in claim 10 wherein said housing comprises a door member movable between an open and closed condition and said lifting means is actuated: (i) by opening movement of said door to said spaced condition and (ii) by closing movement of said door to said valve-opening condition.

12. The invention defined in claim 9 wherein said apparatus further includes: (i) a vacuum conduit terminal means, (ii) an ink bypass conduit terminal means and (iii) ink level sensing terminal means and wherein each of said last-mentioned terminal means include a valve member biased to a normally closed position and actuatable to an open condition by engagement with predetermined structure of an ink cartridge.

13. In ink jet printing apparatus of the kind having a print head assembly and ink supply and return conduit means for said assembly, an improved ink reservoir system comprising:

(1) an ink cartridge including:

(a) side, top and bottom wall means forming an ink supply and return reservoir;

(b) means in said top wall means for defining: (i) an ink supply port and (ii) an ink return port; and (c) first and second valve means, respectively in said supply and return ports, both of said valve means being biased to a normally closed condition, and (2) a cartridge interface construction including:

(d) housing means for positioning an ink cartridge in a predetermined location within said apparatus;

(e) supply and return conduit terminal means, each located at a predetermined location relative to said housing means and each including a valve member biased to a normally closed position and actuatable to an open condition by engagement with predetermined structure of an ink cartridge; and (f) means for moving an ink cartridge positioned in said housing between valve-opening and spaced positons relative to said terminal means.

* * * * *